United States Patent [19]
Seymour

[11] Patent Number: 5,807,054
[45] Date of Patent: Sep. 15, 1998

[54] BULK UNLOADER/RECLAIMER WITH BUCKET CHAIR COVER AND GUIDE

[76] Inventor: Timothy Harrison Seymour, 9544 Moran St., Biloxi, Miss. 39532

[21] Appl. No.: 664,114

[22] Filed: Jun. 14, 1996

[51] Int. Cl.[6] ....................................................... B63B 27/00
[52] U.S. Cl. ...................................... 414/141.1; 414/140.9; 198/700
[58] Field of Search ............................... 198/308.1, 509, 198/700, 710, 709; 414/139.4, 140.2, 140.8, 140.9, 141.1, 142.1, 142.2, 142.5

[56] References Cited

U.S. PATENT DOCUMENTS

| | | | |
|---|---|---|---|
| 4,264,003 | 4/1981 | Gill | 414/140.2 |
| 4,830,177 | 5/1989 | Baba et al. | 198/710 |
| 5,393,187 | 2/1995 | Seymour | 198/509 |

FOREIGN PATENT DOCUMENTS

| | | | |
|---|---|---|---|
| 3513280 | 8/1986 | Germany | 198/710 |
| 69635 | 4/1983 | Japan | 414/146.1 |
| 1383279 | 2/1975 | United Kingdom | 414/141.1 |
| 22751 | 10/1994 | WIPO | 414/141.1 |

*Primary Examiner*—Karen B. Merritt
*Assistant Examiner*—Gregory A. Morse

[57] ABSTRACT

A continuous bulk unloader/reclaimer that utilizes a bucket conveyor chain 13 to remove cargo 11 from the hold 9 of vessels such as ships, barges, railroad cars, pits, stockpiles etc. The conveyor chain 13 has components that guide it vertically outward and downward to extend the range of the digging loop 15. Furthermore, the conveyor chain 13 has components that protect and guide it as it traverses the digging loop 15.

7 Claims, 4 Drawing Sheets

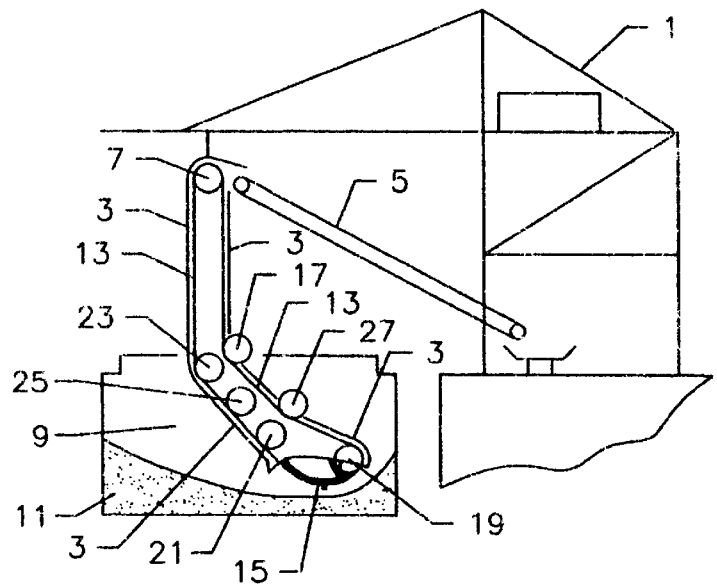
FIGURE — 1
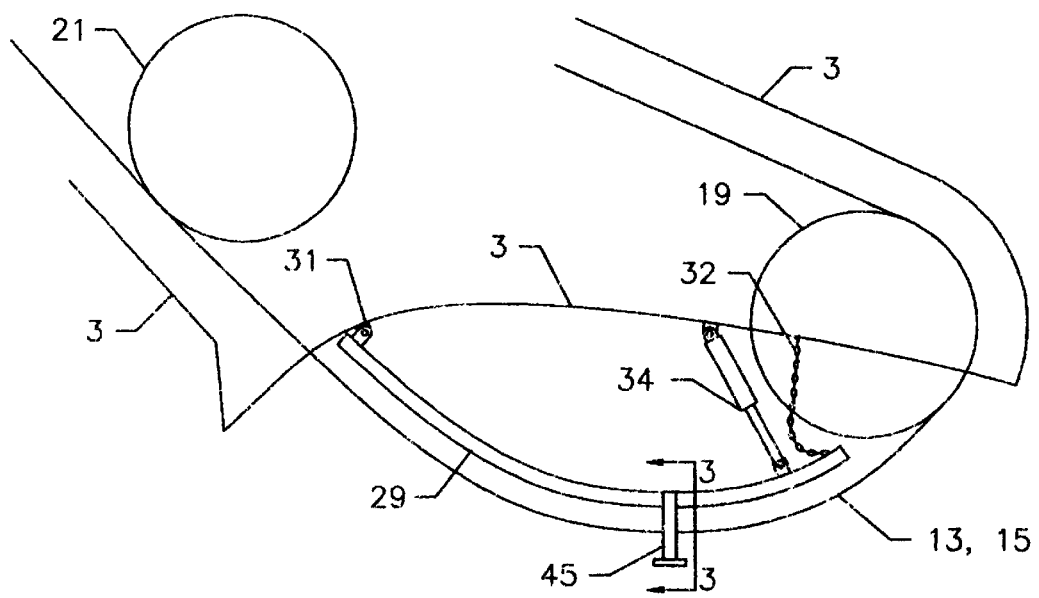
FIGURE — 2
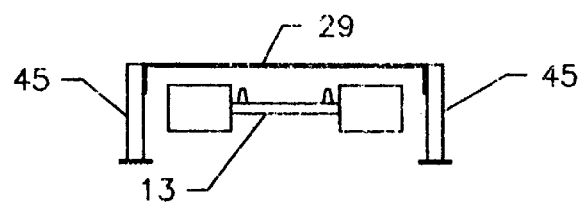
FIGURE — 3

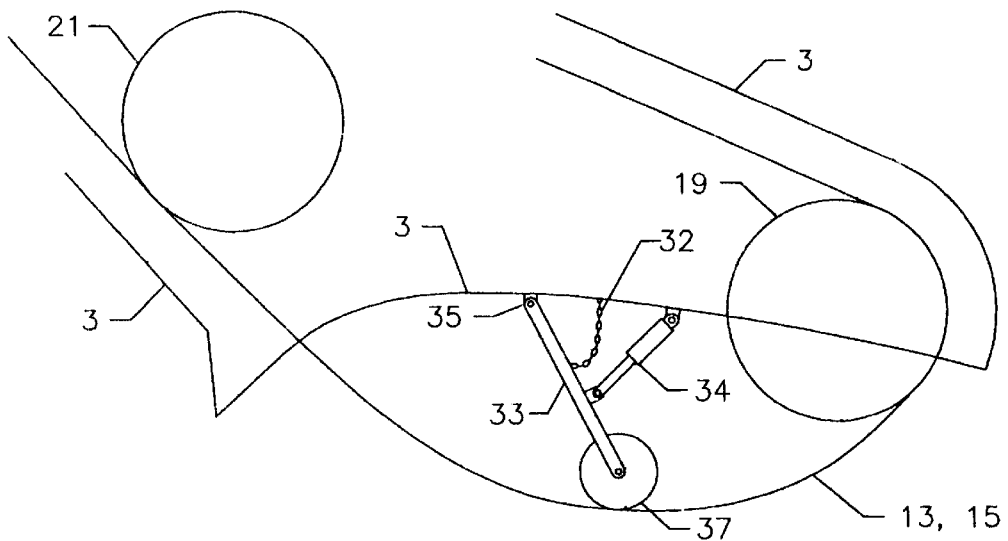
FIGURE — 8
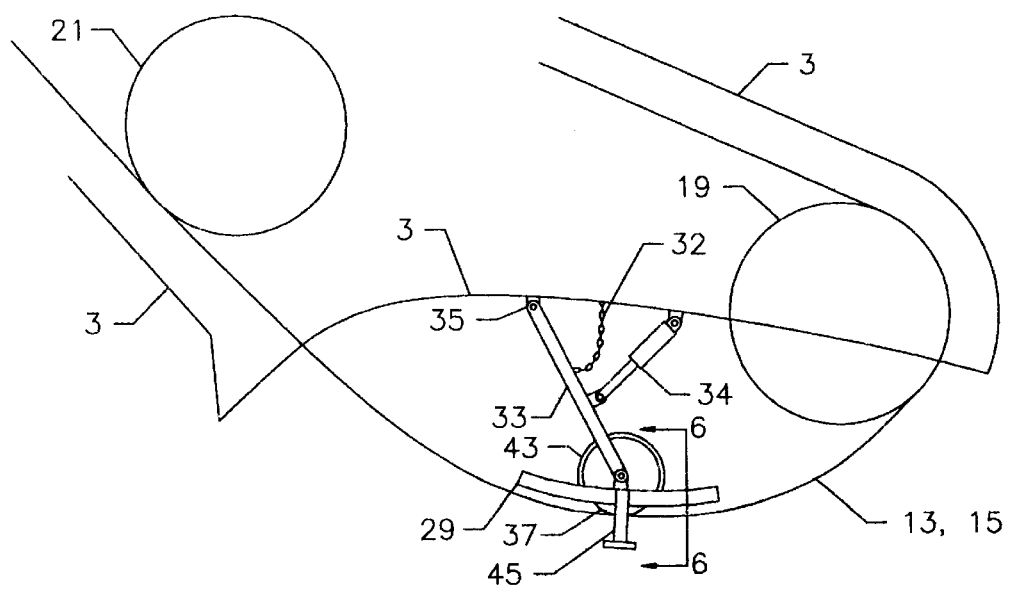
FIGURE — 9

BULK UNLOADER/RECLAIMER WITH BUCKET CHAIR COVER AND GUIDE

BACKGROUND—FIELD OF INVENTION

This invention relates to continuous bulk unloaders/reclaimers (herein afterward referred to as continuous unloaders) that use a digging chain to reclaim and convey granular or powder bulk materials such as grains, coal, ores, fertilizers, rocks, soil, etc. from pits, stockpiles, and the cargo holds of vessels such as ships, barges, railcars, and the like.

BACKGROUND—DESCRIPTION OF PRIOR ART

U.S. Pat. No. 3,144,142 introduced an unloader for ships that utilized a digging chain that reclaimed cargo as it pulled through the cargo in a digging loop. This patent was further improved upon by U.S. Pat. No. 3,378,130.

In U.S. Pat. No. 4,671,783 and 4,917,234 I introduced improvements for digging chain unloaders.

In U.S. Pat. No. 5,127,883 I introduced a chain and sprocket arrangement that utilized an elastomer bushed chain and special sprocket that allows for increased performance in digging chain type unloaders by allowing operation at increased speeds.

In U.S. Pat. No. 5,393,187 I introduced improvements to the elastomer bushed digging chain unloader.

In U.S. Pat. No. 5,469,957 I introduced a metal plate type of chain that also improved speed, performance, and lowered maintenance in digging chain type unloaders.

The present invention will introduce additional means for improving digging chain unloader performance.

OBJECTS AND ADVANTAGES

The following are the objects and advantages of my invention.

To introduce a much improved digging chain type continuous bulk unloader/reclaimer that utilizes a digging loop. More specifically:

Add to the wheel arrangement to improve the reach of the digging loop.

Add a plate that keeps material being reclaimed from avalanching onto the bucket conveyor chain and pushing it sideways off track while it traverses the digging loop.

Add guide wheels to keep the chain tracking in the digging loop when moving sideways through the material or during an avalanche.

Make the above features flexible to prevent the digging chain from being crushed or having accelerated wear from contact with the cargo or the bottom of the vessel.

Adding accessory items to the above items to improve their workability.

Readers will find further objects and advantages of the invention from a consideration of the ensuing description and the accompanying drawings.

DRAWING FIGURES

FIG. 1 shows a schematic drawing of my improvement for deflecting the bucket conveyor chain outward prior to forming the digging loop.

FIG. 2 is a schematic view of the lower part of FIG. 1 and shows the digging loop of the bucket chain with a plate to protect the chain from avalanches of the cargo.

FIG. 3 is a cross sectional view along line 3—3 of FIG. 2.

FIG. 8 shows a pivot arm with a guide wheel attached for tracking the chain in the digging loop.

FIG. 9 is a variation of FIG. 8 with added items to assist protecting and guiding the chain as it traverses the digging loop.

Figure 4:
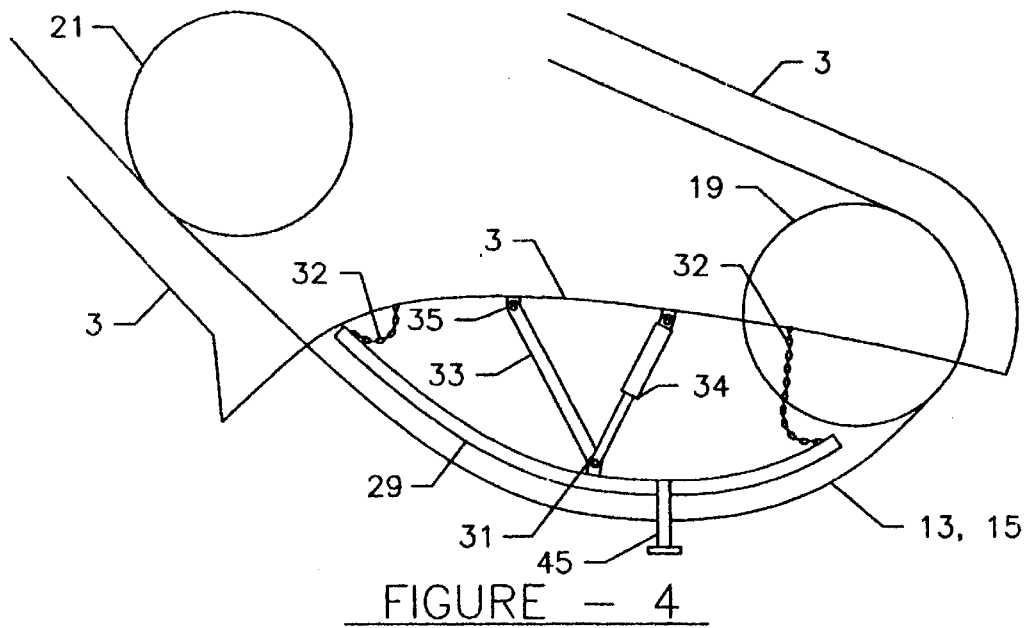
FIG. 4 shows a variation of how to mount the plate of FIG. 2.

DRAWING REFERENCE NUMERALS 1 support structure
3 bucket conveyor frame
5 discharge conveyor
7 upper wheel
9 vessel's hold
11 cargo
13 bucket conveyor chain
15 Digging loop of bucket conveyor—used for reclaiming
17 first deflector wheel
19 guide wheel
21 gather wheel
23 second deflector wheel
25 intermediate wheel
27 control wheel
29 plate/support frame
31 plate hinge
32 support chain
33 arm
34 actuator/dampener
35 arm hinge
37 tracking wheel
39 axle
41 bearing
43 wheel cover
45 detector

DESCRIPTION OF THE INVENTION

FIG. 1 shows a continuous unloader according to the preferred embodiment of the invention. The unloader is comprised of a support structure 1 which supports a bucket conveyor frame 3 which supports a plurality of wheels. The plurality of wheels support and circulate a bucket conveyor chain 13. The bucket conveyor frame 3 is lowered into a vessel's hold 9 where its bucket conveyor chain 13 circulates in a manner to reclaim, elevate, and transfer the cargo 11 to a discharge conveyor 5 which removes the cargo 11 for storage, etc.

More specifically the bucket conveyor frame 3 wheel's include an exit wheel 17 which directs the bucket conveyor chain 13 outward and down to guide wheel 19. A control wheel 27 is interposed between exit wheel 17 and guide wheel 19 to help guide the bucket conveyor chain 13. Guide wheel 19 directs the chain 13 downward into a digging loop 15 which is used to fill the buckets of the bucket conveyor chain 13 by dragging them through the cargo 11. After traveling through the digging loop 15 the bucket conveyor chain 13 is gathered by gather wheel 21 and directed to a deflecting wheel 23. An intermediate wheel 25 is interposed between gather wheel 21 and deflecting wheel 23 to help guide the bucket conveyor chain 13. Deflecting wheel 23 directs the chain 13 upward to upper wheel 7 where the cargo is then discharged onto the discharge conveyor 5. The upper wheel 7 directs the chain 13 downward to the exit wheel 17 thereby completing one complete circuit of the bucket conveyor chain 13. The wheels are mounted to the frame by conventional shafts and bearings so that the bucket conveyor chain 13 runs inside the bucket conveyor frame 3 wherever possible to control dust and spillage.

Referring to FIG. 2, the improved unloader is further comprised in the area of the digging loop 15 between guide wheel 19 and gather wheel 21 with additional components to stabilize, track, and protect the digging chain 13 as it traverses through the digging loop 15. More specifically after the bucket chain 13 is deflected downward to form the digging loop 15 by the guide wheel 19 it is protected from cargo 11 that would fall directly on top of it by a plate/support frame 29. The plate/support frame 29 is connected by a hinge 31 to the bucket conveyor frame 3. An actuator/dampener 34 is connected between the plate/support frame 29 and the bucket conveyor frame 3 to control the position and motion of the plate/support frame 29. A support chain 32 is also connected between the bucket conveyor frame 3 and the plate/support frame 29 to control the extreme position that the plate/support frame 29 can travel. Detectors 45 comprised of a vertical structural member are attached to the plate/support frame 29 to prevent the conveyor bucket chain 13 from being crushed between the plate/support frame 29 and the cargo 11 in the event that the bucket conveyor frame 3 is lowered to quickly down into the cargo 11.

Referring to FIG. 3, the plate/support frame 29 is located adjacent to the bucket conveyor chain 13.

Referring to FIG. 4, a variation of mounting the plate/support frame 29 is shown where the hinge 31 of the plate/support frame 29 can be connected to an arm 33. Arm 33 is hinged to the frame 3 via an arm hinge 35. The actuator/dampener 34 is connected near the plate hinge 31 to control the position and movement of the arm 33 which in turn controls the position and movement of the plate/support frame 29. Support chains 32 are connected between the frame 3 and the plate/support frame 29 to control the extreme position of the plate/support frame 29.

Figure 5:
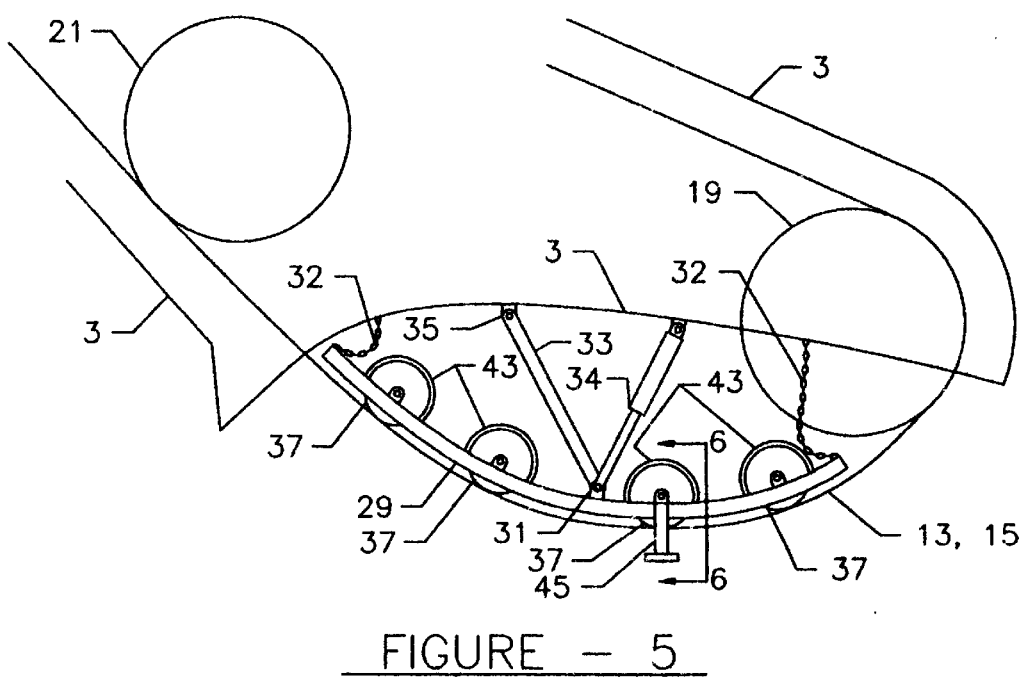
FIG. 5 shows a variation of the plate of FIGS. 2 and 4 which has wheels added to help guide the bucket chain.

Referring to FIG. 5, a plurality of wheels 37 can be added to the plate/support frame 29 of FIG. 4 to help guide and track the bucket conveyor chain 13 as it traverses through the digging loop 15 of FIG. 1. A wheel cover 43 surrounds wheels 37 to protect them from damage and stalling from cargo avalanches.

Figure 6:
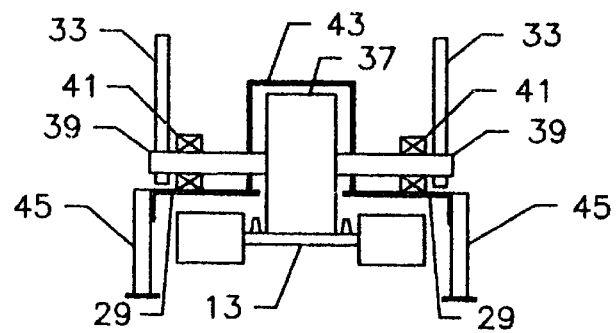
FIG. 6 is a cross sectional view along line 6—6 of FIG. 5.

Referring to FIG. 6, which is a cross sectional view along line 6—6 of FIG. 5, wheels 37 are mounted to the plate/support frame 29 via an axle 39 and a bearing 41. The axle 39 is extended outward to form a pin for mounting the plate/support frame 29 to the arms 33. Detectors 45 comprised of a vertical structural member are attached to the plate/support frame 29 to prevent the conveyor bucket chain 13 from being crushed between the plate/support frame 29 and the cargo 11 in the event that the bucket conveyor frame 3 is lowered too quickly down into the cargo 11.

Figure 7:
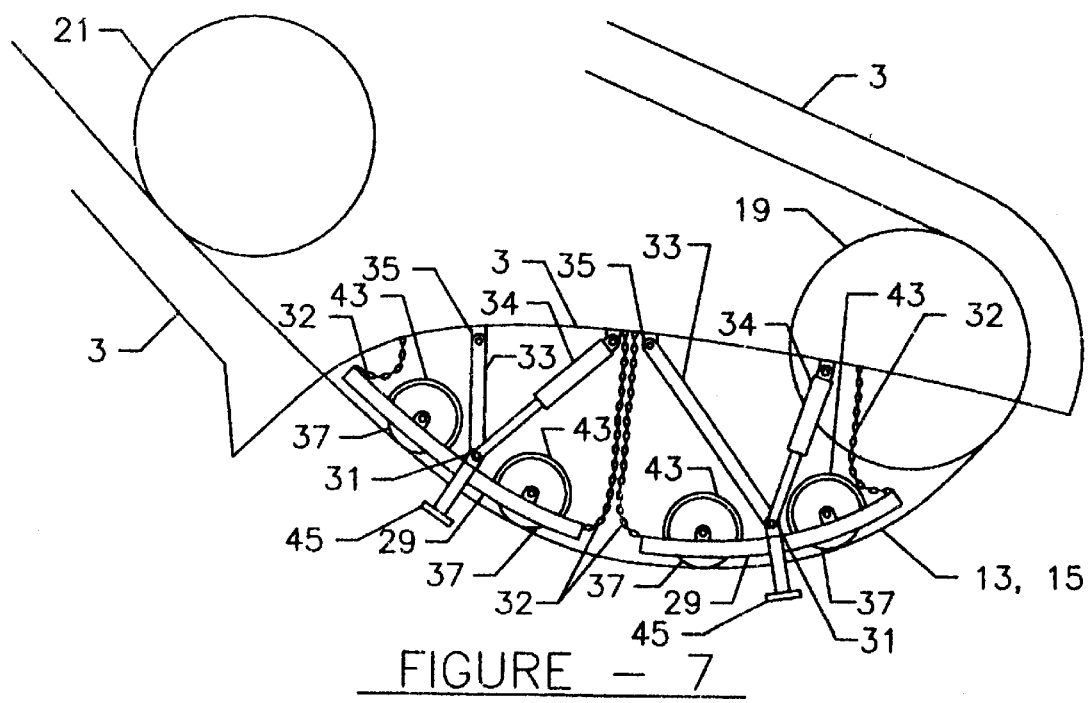
FIG. 7 is a variation of FIG. 5 with a plurality of plates, arms, and wheels.

Referring to FIG. 7, a variation of mounting the plate/support frame 29 is shown where it is divided into a plurality of plate/support frames 29 each supported independently of the other. Wheels 37 are attached to the plurality of plate/support frames 29.

Referring to FIG. 8 a single wheel 37 can be attached directly to an arm 33 without being supported by the plate/support frames 29 shown in the above described figures.

Referring to FIG. 9 a single wheel 37 can be attached to a plate/support frame 29 without using a plurality of wheels 37 as shown in FIGS. 5 and 7.

OPERATION OF THE INVENTION

Referring to FIGS. 1 and 2, the frame 3 surrounds the bucket chain everywhere except in the vicinity of the digging loop. This protects the digging chain from damage and contains dust.

Referring to FIG. 1, the support structure 1 holds the bucket conveyor frame 3 adjacent to the cargo 11 in the vessel's hold 9. The support structure 1 can be mobile or fixed. It functions to allow the bucket conveyor to be movable inside the vessel's hold 9, and from hold to hold, and from one vessel to another. The bucket conveyor chain 13 is supported, circulated, and guided by the wheels 7, 17, 27 19, 21, 25, 23. The said wheels can be powered or idlers as required. They are attached to the bucket conveyor frame 3 by conventional means utilizing bearings, shafts, couplings, motors, etc. which are not shown. The bucket conveyor chain 13 drags through the cargo 11 as they traverse the digging loop 15. The bucket conveyor chain 13 then elevates the cargo up and over wheel 7 where a combination of gravity and centrifugal force are used to dump the cargo out of the bucket conveyor chain 13 onto the discharge conveyor 5 where it is removed from the unloader.

Referring to FIG. 1, there are three essential functions of the bucket conveyor frame 3. The first two functions are taught by prior art. The first function being to form the bucket conveyor chain 13 into a digging loop 15 as provided by wheels 19 and 21. The second function being to move the bucket conveyor chain 13 more or less vertically upward as provided by wheel 7, 17, and 23. The $3^{rd}$ function and newly invented function is to provide a lateral extension horizontally outward and downward of the bucket conveyor frame 3 so that the digging loop 15 can reach into the far corners of vessels and under hatch combing without being excessively long and floppy. A long digging loop 15 can make it very difficult to track and guide the bucket conveyor chain 13. The inclined portion of the frame between wheels 21 and 23 is positioned in close proximity of the bucket conveyor chain 13 to control reclaimed cargo spillage from the bucket conveyor chain 13 while it travels up the incline from gather wheel 21 to deflecting wheel 23.

Referring to FIGS. 2 and 3, as the conveyor bucket chain 13 traverses the digging loop 15 between guide wheel 19 and gather wheel 21 it is covered and protected from cargo avalanches by a plate/wheel support frame 29 that is located adjacent to the top of the bucket conveyor chain 13. When an avalanche occurs it strikes the plate/wheel support frame instead of the bucket conveyor chain 13. The plate/wheel support frame 29 has a plate hinge 31 that hinges it to the bucket conveyor frame 3 so that it is flexible. A support chain is attached to the bucket conveyor frame 3 at one of its ends and to the plate/wheel support frame 29 at its other end. This controls the extreme position of the plate/wheel support frame 29. An actuator/dampener 34 is connected between the bucket conveyor frame 3 and the plate/wheel support frame 29 to control its position and dampen out unwanted motion. A detector 45 is attached to the plate/wheel support frame 29 to protect the bucket conveyor chain 13 from being crushed between the plate/wheel support frame 29 and the bottom of the vessel's hold 9 or the cargo 11. Should the bucket conveyor frame 3 be lowered too quickly or too far down into the cargo 11 or hold 9 the detector will push up on the plate/wheel support frame 29 allowing relief. The actuator/dampener 34 can be used to help lift the plate/wheel support frame by acting as a counterbalance.

Referring to FIG. 4, an alternative way to attach the plate/wheel support frame 29 of FIG. 2 is to connect one end to an arm 33 by a hinge 31. The arm 33 is connected at its other end by a hinge 35 to the bucket conveyor support frame 3. A support chain 32 is added at both ends of the plate/wheel support frame 29 to control its extreme positions. The actuator/dampener 34 is attached by the a hinge 31 to control both the arm's 33 and plate/wheel support frame's position and dampen out unwanted motion. The other components of FIG. 4 function in the same way as those described above for FIGS. 2 and 3.

Referring to FIGS. 5 and 6, tracking wheels 37 are mounted to the plate/wheel support frame 29 so that they contact and prevent the bucket conveyor chain 13 from sliding over the plate/wheel support frame 29. This reduces bucket conveyor chain wear due to function. These wheels 37 also help to guide and track the bucket conveyor chain 3 when the bucket conveyor frame 3 is moved laterally through the cargo or when an avalanche pushes sideways on the bucket conveyor chain 3. A cover 43 is provided each of the wheels to prevent them from being engulfed by cargo avalanches. The other components function as described above for FIGS. 2,3, and 4.

Referring to FIG. 7, a plurality of plate/wheel support frames 29 can be used in place of the single plate/wheel support frame. These would function as described above for FIGS. 2 through 7 and would have some or all of the components described for those figures.

Referring to FIG. 8, a guide wheel 37 is directly attached to the arm 33 without the use of plate/wheel support frame 29 as described in previous figures. A support chain 32 is between the arm 33 and the support frame 3 to control its extreme positions.

Referring to FIG. 9, a plate/wheel support frame 29 can have only one guide wheel attached to it. It would function as described above for FIG. 5.

While the above description contains many specifics, the reader should not construe these as limitations on the scope of the invention, but merely as examples of preferred embodiments thereof. Those artisans skilled in the art will envision many other possible variations that are within its scope.

Accordingly the reader is requested to determine the scope of the invention by the appended claims and their legal equivalents, and not by the examples which have been given.

I claim:

1. In an improved continuous bulk unloader/reclaimer comprising:

a support structure;

a frame;

an endless bucket chain;

a plurality of wheels mounted to the frame and supporting the endless bucket chain for circulation about the plurality of wheels;

means for connecting the frame to the support structure;

means connected to a lower end of the frame for deflecting the bucket chain outward and downward to form a digging loop extending below the frame, wherein the bucket chain contacts material to be reclaimed while traversing the loop, the improvement comprising:

a tracking wheel;

a protective cover plate hinged to the frame and attached to the tracking wheel so that the tracking wheel moves along an arcuate path relative to the frame;

wherein the protective cover plate shields the bucket chain from falling material during reclamation of the material and the wheel guides the bucket chain as it traverses the loop.

2. The unloader/reclaimer of claim 1 further comprising a wheel cover mounted to protect the wheel from avalanches of the material being reclaimed.

3. The unloader/reclaimer of claim 1 further comprising a detector attached to the protective cover plate, wherein the detector pushes upward on the cover plate, causing the cover plate to swing relative to the frame and prevent the bucket chain from being crushed when the unloader/reclaimer is lowered too fast or too far into the hull.

4. In an improved continuous bulk unloader/reclaimer comprising:

a support structure;

a frame;

an endless bucket chain;

a plurality of wheels mounted to the frame and supporting the endless bucket chain for circulation about the plurality of wheels;

means for connecting the frame to the support structure;

means connected to a lower end of the frame for deflecting the bucket chain outward and downward to form a digging loop extending below the frame, wherein the bucket chain contacts material to be reclaimed while traversing the loop, the improvement comprising:

a tracking wheel;

an element hinged to the frame and attached to the tracking wheel so that the tracking wheel moves along an arcuate path relative to the frame;

a wheel cover attached to the hinged element, wherein the wheel cover shields the tracking wheel from falling material during reclamation of the material.

5. The unloader/reclaimer of claim 4, further comprising:

a detector mounted to the wheel and pushing upward on the wheel so that the hinged element pivots relative to the frame and prevents the bucket chain from being crushed when the unloader/reclaimer is lowered too far or too fast into a vessel's hold.

6. In an improved continuous bulk unloader/reclaimer comprising:

a support structure;

a frame;

an endless bucket chain;

a plurality of wheels mounted to the frame and supporting the endless bucket chain for circulation about the plurality of wheels;

means for connecting the frame to the support structure;

means connected to a lower end of the frame for deflecting the bucket chain outward and downward to form a digging loop extending below the frame, wherein the bucket chain contacts material to be reclaimed while traversing the loop, the improvement comprising:

a first wheel of said plurality of wheels mounted at the lower end of the frame to gather the bucket chain as it exits the digging loop;

a second wheel of said plurality of wheels mounted lower than the first wheel and causing the bucket chain to travel at an upward incline from the second wheel to the first wheel; and a portion of the frame partially surrounding the bucket chain as it travels the loop from the second wheel to the first wheel, the portion of the frame controlling spillage onto the bucket chain as it travels along the incline.

7. In an improved continuous bulk unloader/reclaimer comprising:

a support structure;

a frame;

an endless bucket chain;

a plurality of wheels mounted to the frame and supporting the endless bucket chain for circulation about the plurality of wheels;

means for connecting the frame to the support structure;

means connected to a lower end of the frame for deflecting the bucket chain outward and downward to form a digging loop extending below the frame, wherein the bucket chain contacts material to be reclaimed while traversing the loop, the improvement comprising:

a protective cover plate hinged to the lower end of the frame and located closely adjacent the digging loop, wherein the cover plate protects the chain from avalanches of the material being reclaimed.

* * * * *